No. 834,531. PATENTED OCT. 30, 1906.
G. W. NEWTON.
CUCUMBER PICKER.
APPLICATION FILED MAY 31, 1906.
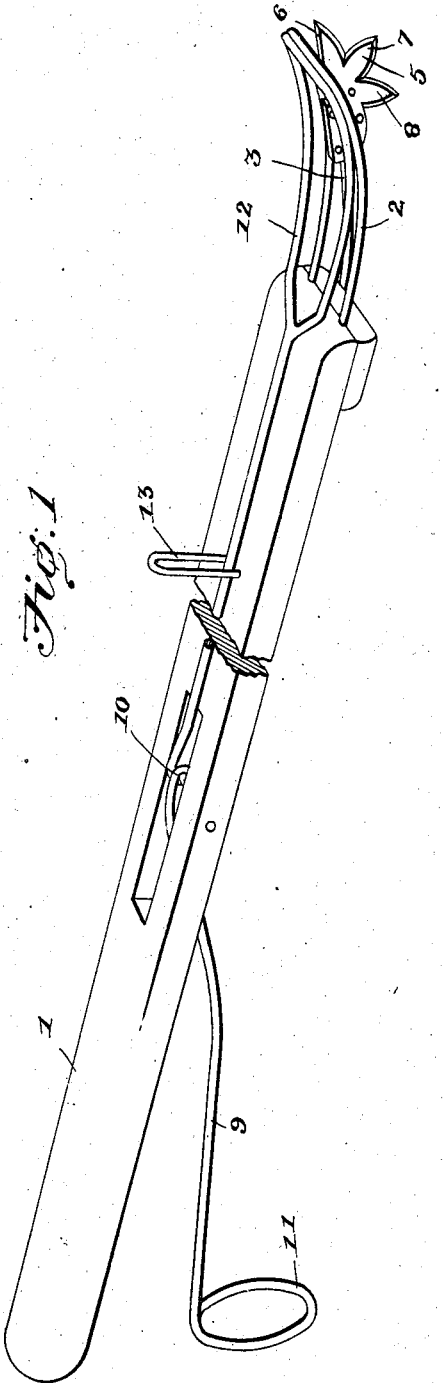
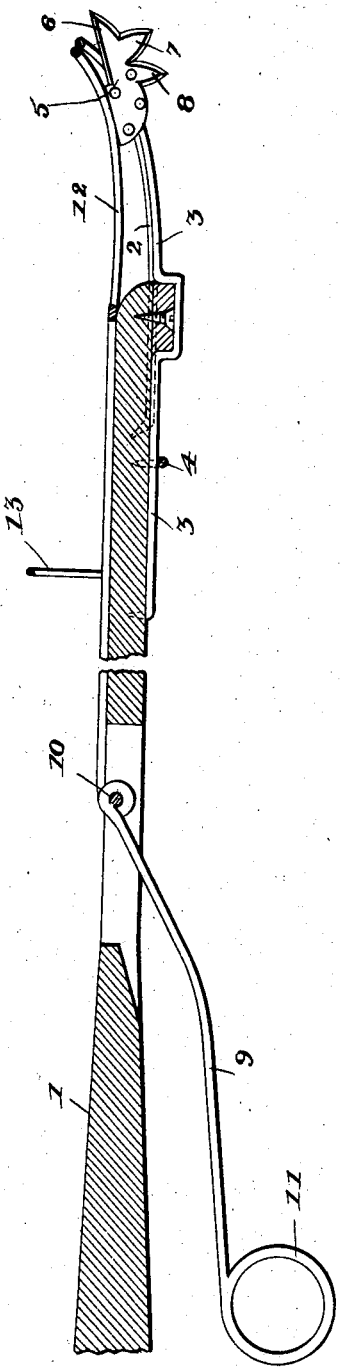
WITNESSES:
George W. Newton, INVENTOR.
By C. A. Snow & Co
ATTORNEYS

UNITED STATES PATENT OFFICE.

GEORGE W. NEWTON, OF HUBBARD, OHIO.

CUCUMBER-PICKER.

No. 834,531. Specification of Letters Patent. Patented Oct. 30, 1906.

Application filed May 31, 1906. Serial No. 319,615.

*To all whom it may concern:*

Be it known that I, GEORGE W. NEWTON, a citizen of the United States, residing at Hubbard, in the county of Trumbull and State of Ohio, have invented a new and useful Cucumber-Picker, of which the following is a specification.

This invention has relation to implements especially adapted to facilitate the operation of picking cucumbers; and it consists in the novel construction and arrangement of its parts, as hereinafter shown and described.

The object of the invention is to provide an implement which is fitted with a cutter constructed and adapted to cut the stem of the cucumber by downward movement, forward or rearward movements.

The implement is provided with a lip which is adapted to pass under the cucumber when severed from the vine, and a pivoted trip or retainer is provided, which is adapted to hold the vegetable against the lip while it is being lifted from the ground and deposited in a receptacle.

The implement is of such length that the operator may use the same standing in upright position and poke around in the vines for a radius of about eight feet. Thus the vines are not trampled on and injured.

The implement greatly facilitates picking of the crop and permits the same to be done without necessitating stooping, and consequently saving the picker the physical discomfiture incident to prolonged stooping posture.

In the accompanying drawings, Figure 1 is a perspective view of the cucumber-picker, and Fig. 2 is a longitudinal sectional view of the same.

The implement consists of the elongated handle 1, to the lower end of which is attached a wire lip 2. Said lip is preferably formed in U shape and is attached at its ends to the said handle portion 1. The said lip is curved longitudinally, and its lower outer end is upwardly inclined. The spring-rod 3 is attached at its inner end to the under side of the handle 1 and extends along the same and projects beyond its lower end, a suitable guide 4 being provided upon the handle 1 and which receives the said spring-rod 3. To the outer end of said rod 3 is attached a knife 5 of peculiar shape and configuration. The said knife is provided with the serrations 6, 7, and 8, each of which constitute cutting edges. For instance, the edge 6 is adapted to be used for cutting the stem of a cucumber when the implement is pushed, the cutting edge 7 is adapted to be used for cutting the stem of the cucumber when the implement is moved down vertically, while the cutting edge 8 is adapted to be used for cutting the stem while the implement is drawn toward the operator.

The cutter 5 is located under the upturned end of the lip 2, and the said lip protects the same from objects that may come in contact with the cutting end of the implement from above. The said lip also houses the cutter 5, so that the lip end of the implement may be used for poking around in the vines and laying bare the vegetables, with a view of separating the same from the vines and harvesting them.

The lever 9 is fulcrumed at the point 10 to the handle 1. The power end of said lever 9 is provided with a ring or hand-grip 11, while the opposite working end of said lever is provided with a frame-shaped portion 12, which is of substantially the same configuration as the lip 2. The said frame 12 is adapted to move vertically over the said lip 2. The handle 1 is provided with the guide 13, which receives the lever 9. After the vegetable has been severed from the vine in the manner above indicated the lip 2 is slipped under the cucumber and the frame 12 is moved down upon the vegetable, and thus it is held in the implement. It is obvious that the operator in grasping the handle portion 11 of the lever 9 retains the vegetable between the frame 12 and lip 2 until it is desired to deposit the same in a receptacle, when by releasing the hold upon the handle 11 of the lever 9 the vegetable may fall from between the lip 12 and frame 2.

Having described my invention, what I claim as new, and desire to secure by Letters Patent, is—

1. An implement of the character described consisting of a handle, a lip attached to the end of said handle and being curved longitudinally, a cutting device attached to the handle and being located adjacent said lip, a pivoted frame adapted to swing on its pivot toward and from said lip.

2. An implement such as described consisting of a handle, a lip attached to the end of said handle and being curved longitudinally, a cutting device also attached to the handle and being located adjacent said lip, a lever fulcrumed to the handle and being provided at its end with a frame of substantially the same configuration as the lip and adapted to move with relation to said lip.

3. An implement such as described consisting of a handle, a lip attached to the end thereof and being curved along its longitudinal axis, a cutting device also attached to the handle and being provided with three distinct cutting serrations disposed in various directions, a pivoted frame attached to the handle and adapted to move on its pivot with relation to said lip.

4. An implement of the character described comprising a handle, a lip attached to the end thereof and being curved along its longitudinal axis, a cutting device also attached to the handle and being located adjacent the end of said lip, said cutting device having three cutting serrations disposed in various directions, a pivoted frame also attached to the handle and being adapted to move with relation to said lip.

5. An implement of the character described consisting of a handle, a lip attached to the end thereof and being curved along its longitudinal axis, a cutting device also attached to the handle and being located adjacent the end of said lip and having three cutting serrations disposed in various directions, a lever fulcrumed to the handle and having at its end a frame, said frame being substantially of the same configuration as the lip and being curved along its longitudinal axis and adapted to move with relation to said lip.

6. A device of the character described consisting of a handle, a lip attached to the end thereof, a spring-frame mounted on the handle to move with relation to said lip, a cutting device arranged adjacent the lip, and a spring-support connecting said cutting device with the handle.

7. An implement of the character described consisting of a handle, a lip attached to the end thereof, a spring-frame mounted on the handle to move with relation to said lip, a cutting device located adjacent the lip and having three cutting serrations disposed in different directions, and a spring-support connecting said cutting device with the handle.

In testimony that I claim the foregoing as my own I have hereto affixed my signature in the presence of two witnesses.

GEORGE W. NEWTON.

Witnesses:
WM. WALTERS, Jr.,
WM. JEFFREYS.